Figure 1:
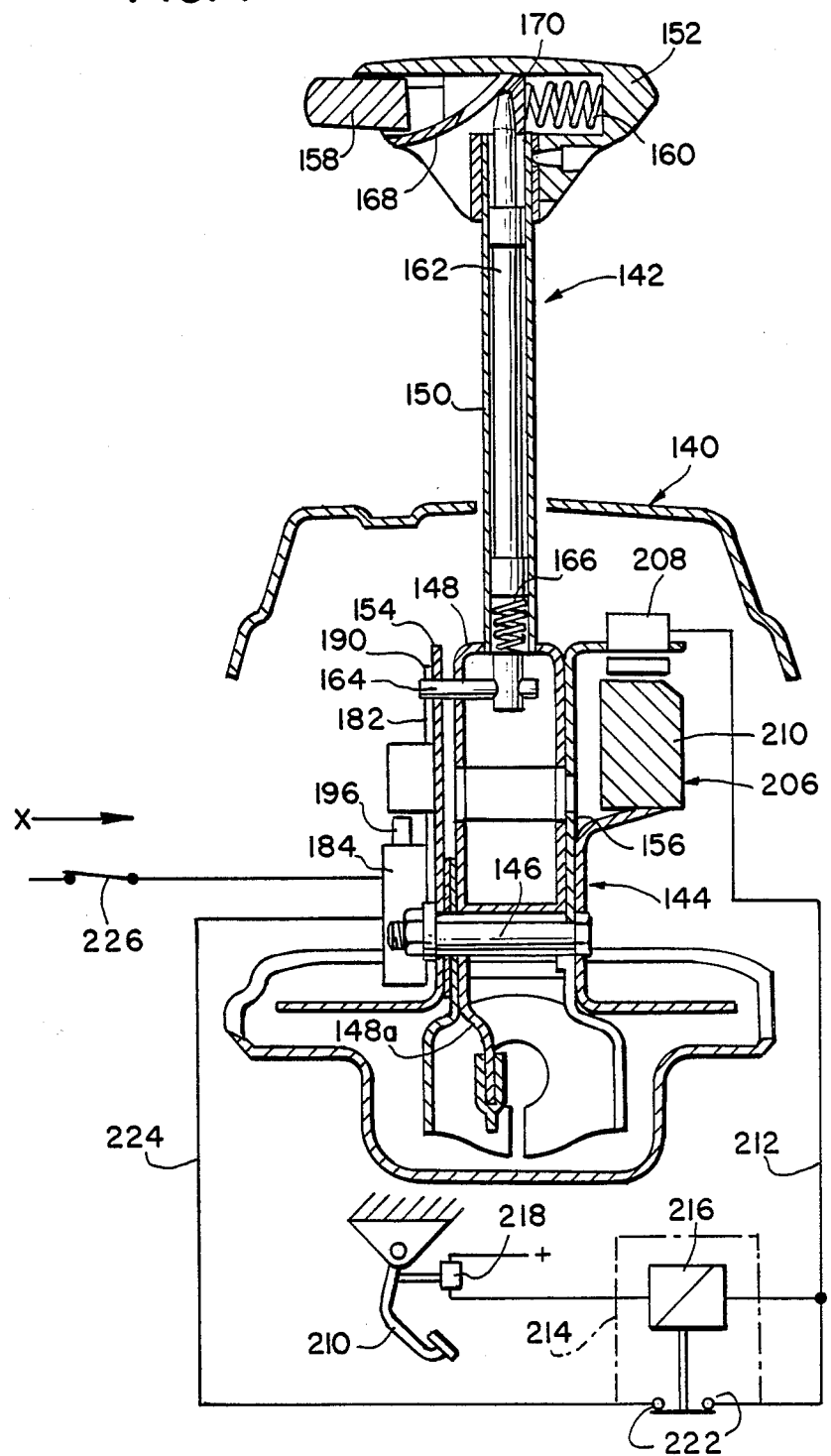

United States Patent [19]

Barske et al.

[11] Patent Number: 4,934,496
[45] Date of Patent: Jun. 19, 1990

[54] CONTROL FOR AUTOMATIC TRANSMISSION IN A MOTOR VEHICLE

[75] Inventors: Heiko Barske, Ingolstadt; Berndt-Robert Höhm, Gaimersheim; Ernst-Olav Pagel, Böhmfeld; Helmut Burkhart, Gaimersheim; Johann Haderer, Kipfenberg/Dunsdorf, all of Fed. Rep. of Germany

[73] Assignee: Audi AG, Ingolstadt, Fed. Rep. of Germany

[21] Appl. No.: 334,773

[22] Filed: Apr. 10, 1989

Related U.S. Application Data

[63] Continuation of Ser. No. 894,531, Aug. 8, 1986, abandoned.

[30] Foreign Application Priority Data

May 22, 1986 [DE] Fed. Rep. of Germany ....... 3617256

[51] Int. Cl.⁵ .................... B60K 41/26; G05G 5/06
[52] U.S. Cl. .................... 192/4 A; 74/483 R; 180/271
[58] Field of Search .......... 192/4 A, 4 C; 74/483 R, 74/538; 180/271

[56] References Cited

U.S. PATENT DOCUMENTS

| 3,169,616 | 2/1965 | Hansaker et al. | 192/4 C |
| 3,942,614 | 3/1976 | Thompson | 192/4 A |
| 4,096,930 | 6/1978 | Viscardi | 192/4 A |
| 4,187,935 | 2/1980 | O'Hern | 192/4 A |
| 4,473,141 | 9/1984 | Mochida | 192/4 A X |

FOREIGN PATENT DOCUMENTS

1203756 4/1986 Canada ..................... 192/4 A

Primary Examiner—Richard Lorence
Attorney, Agent, or Firm—Lalos & Keegan

[57] ABSTRACT

The disclosure relates to a control mechanism for automatic transmission in a motor vehicle to prevent operation of a selector lever under certain conditions. For example, the selector lever can be locked into the park position and shifted out of this position only after the brake pedal has been operated. The locking mechanism includes a manually controllable catch mechanism which cooperates with an electro-magnetically operated mechanism to achieve the desired selector lever control.

12 Claims, 2 Drawing Sheets

CONTROL FOR AUTOMATIC TRANSMISSION IN A MOTOR VEHICLE

This is a continuation of application Ser. No. 894,531 filed Aug. 8, 1986 now abandoned.

The present invention relates to a control device for an automatic transmission in a motor vehicle where the motor vehicle has a brake pedal and a selector lever with at least one neutral position for selection of a neutral range of transmission as well as at least one drive position.

In contrast to vehicles with manually shiftable transmissions in which a clutch must be engaged when a speed range is to be changed, in vehicles having automatic transmission it suffices merely to displace the selector lever from a neutral position to a drive position to provide an appropriate linkage between the engine and the drive wheels. Consequently, there is no necessity for the driver to familiarize himself with the position of the foot pedals before a vehicle with an automatic transmission is set in motion. Consequently, it occasionally occurs with vehicles having automatic transmissions that such vehicles are unintentionally set in motion or even become uncontrollable for the driver when he is unfamiliar with the location of the brake pedal and depresses the accelerator pedal by mistake.

The present invention has for its principal objective to provide an improvement for vehicles having automatic transmissions that will prevent an accidental or unintentional movement of the motor vehicle.

A twofold purpose is served by the mechanism provided in accordance with the present invention. Initially, the driver must have a foot on the brake pedal at the time of entry into a selected speed range, i.e., when the vehicle begins to move on the basis of a closed linkage established between the engine and the drive wheels. The second purpose served is that the driver is caused to familiarize himself with the location of the brake pedal before he steps on the accelerator pedal to propel the vehicle, and he can locate the brake pedal with certainty when it is required to do so.

The mechanism provided in accordance with the present invention is operable to intervene directly in the transmission control process or, as is particularly advantageous, can act directly on the selector lever of the automatic transmission by means of a locking mechanism that locks the selector lever in the neutral position if the brake pedal has not been actuated. This provides the advantage that the driver is apprised immediately by the immobility of the selector lever that he must operate the brake pedal.

Figure 2:
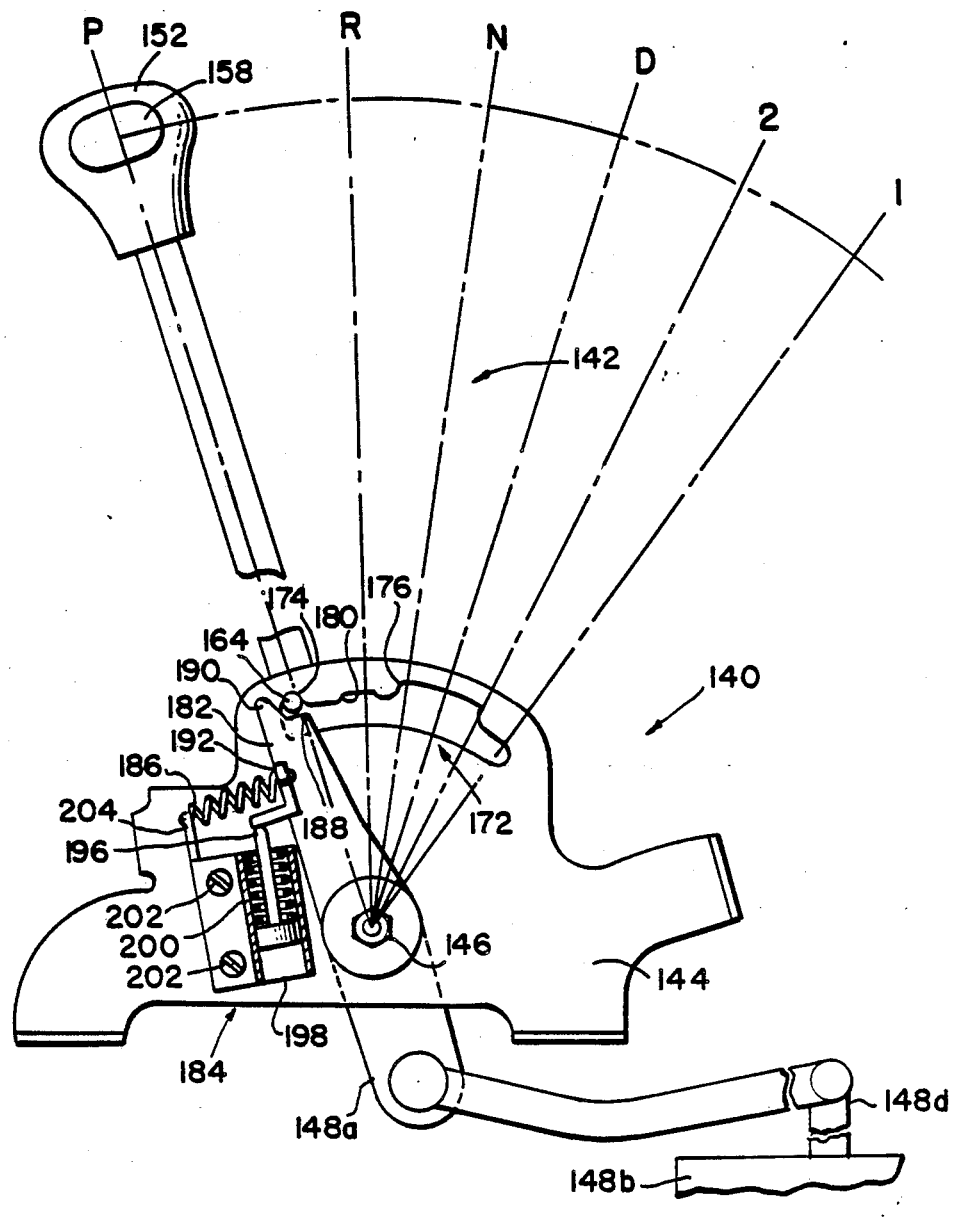

Other objects and advantages of the present invention will become more apparent from the following description taken in conjunction with the accompanying drawings wherein:

FIG. 1 is a vertical cross-sectional view of an embodiment of the invention; and FIG. 2 is a side elevational view of the embodiment shown in FIG. 1, facing in the direction of the arrow shown in FIG. 1.

FIGS. 1 and 2 illustrate an embodiment of the invention which consists of a selector lever mechanism 140 provided with a selector lever 142 pivotally mounted on a support pin 146 secured in a bracket 144 fastened to the floor of a vehicle. Selector lever 142 includes an inverted U-shaped base section 148, a tubular lever section 150 and an operating handle 152. Base section 148 is movable between a pair of laterally spaced, vertically disposed wall members 154 and 156 of bracket 144. Provided in selector lever 142 is a manually operated catch mechanism that includes a push button 158, a spring 160, a rod 162 with a catch pin 164 projecting radially beyond base section 148 and a coil spring 166.

Push button 158 which is movable within operating handle 152 is biased outwardly by spring 160 and has a sloped or cam surface 168 that engages a roller 170 mounted on the upper end of rod 162. Upon depressing push button 158 and displacing it inwardly into operating handle 152 against the force of spring 160, rod 162 will be caused to move downwardly upon engagement of cam surface 168 with roller 170. Rod 162 is urged upwardly by means of spring a 166 interposed between the lower end of the rod and base section 148. Formed on base section 148 and projecting downwardly therefrom is an arm member 148a which is operatively connected to an automatic transmission 148b through a set of links 148c and 148d for transmitting motion from the selector lever to the transmission in the conventional manner.

Catch pin 164 mounted on the lower end of rod 162 projects laterally through an opening in base section 148 and into an arcuate slot 172 formed in an adjacent plate or wall member 154 of bracket 144. Provided in arcuate slot 172 is a recess or indentation 174 that is adapted to receive catch pin 164 to lock the selector lever in a park or "P" position. In addition to indentation 174, arcuate slot 172 includes indentations having stop surfaces 176 corresponding to a neutral or "N" position of the transmission, 178 corresponding to the second drive or "D2" position and 180 corresponding to the reverse or "R" position. As shown in FIG. 2, the drive position of the lever is disposed between stop surfaces 176 and 178 and the first drive position is located at the rear end of arcuate slot 172.

For the purpose of illustration of the present invention, the operation of the selector lever and the catch pin with respect to indentation 174, corresponding to the park position, will be described. As will be described, catch pin 164 cooperates with a locking mechanism including a locking member 182, an electrically actuated solenoid 184 and a retracting spring 186.

Locking member 182 consists of an arm member pivotally mounted on pin 146. The upper end of the locking member is recessed to provide a shoulder 188 and a nose portion 190. When the locking member is in a locking position as shown in FIG. 2, shoulder 188 is disposed in radial alignment with catch pin 164 relative to the axis of pin 146 to prevent the radial displacement of pin 164 from indentation 174, and nose portion 190 will be adapted to engage catch pin 164 to prevent the locking member from pivoting further in a clockwise direction relative to FIG. 2 to displace shoulder 188 beyond radial alignment with catch pin 164. In the position as shown in FIG. 2, selector lever 142 is locked in the park or "P" position because catch pin 164 is prevented from displacing radially or downwardly due to the positioning of shoulder 188.

Mounted on wall member 154 of bracket 144 adjacent locking member 182 is electrically actuated solenoid 184. The solenoid includes a housing 198 secured to wall member 154 by means of a pair of screws 202, a plunger 196 and a coil 200. Housing 198 is provided with a connecting post member 204 spaced from the upper portion of locking member 182. Mounted on the locking member and movable therewith is an L-shaped member having an arm portion 192 rigidly secured to the locking member and an arm member 194 projecting laterally from the locking member and having the underside thereof engaged by the upper end of plunger 196. A tension spring 186 interconnects connecting post 204 and arm portion 192 of the L-shaped member.

Upon extension of plunger 196 as when the solenoid is energized, the plunger will engage the underside of arm portion 194 to pivot the locking member in a clockwise direction relative to FIG. 2 about the axis of mounting pin 146 to position the locking member as shown in FIG. 2 with shoulder 188 being in radial alignment with catch pin 164 disposed in indentation 174, and nose portion 190 of the locking member engaging catch pin 164 to prevent the locking member from rotating further clockwise past the position as shown in FIG. 2. Upon deenergization of the solenoid, spring 186 will cause the locking member to pivot in a counterclockwise direction relative to FIG. 2 to remove shoulder 188 out of radial alignment with catch pin 164. Under such conditions, the driver will be able to depress push button 158 to cause rod 162 to displace axially along the length thereof and displace catch pin 164 out of indentation 174. The selector lever then would be free to be moved in any of the reverse, neutral or drive positions as shown in FIG. 2.

Referring to FIG. 1, an electric interlock switch 206 is mounted on side wall 156. A contact 208 of switch 206 is mounted on and pivotal with base section 148 of the selector lever assembly. The stationary contact portion of switch 206 is mounted on side wall 156. When selector lever 142 is in the park or "P" position, switch 206 operates to emit a negative signal in a first electrical circuit which bypasses an electric interrupter switch of the vehicle an enables the vehicle to be started in the park or "P" position. Starting of the vehicle cannot occur with the selector lever in any other position including the neutral position.

The negative signal of switch 206 is transmitted through a second electrical circuit over lead wire 212 to a coil 216 of an interrupter relay 214 whose other output is connected to a brake light switch 218 on a brake pedal 210 of the vehicle. Brake light switch 218 is connected to the positive potential of the electrical system of the vehicle. Switch contacts 222 of interrupter relay 214 are connected on one side to electric interlock switch 206 of selector lever mechanism 140 and on the other, through a lead wire 224, to coil 200 of solenoid 184. The other terminal of coil 200 is connected to the positive potential of the vehicle electrical system through an ignition switch 226.

FIG. 2 of the drawings illustrates the selector lever mechanism in the park or "P" position, catch pin 164 being received in indentation 174 of wall member 172. Brake pedal 220 is assumed to be in the nondepressed or inoperable position so that the coil of interrupter relay 214 is not energized and interrupter relay contacts 222 are closed. Since ignition switch 226 also is in the closed position, coil 200 of the solenoid will be energized. Plunger 196 correspondingly will be in the extended condition relative to housing 198 of the solenoid to cause the locking member to be pivoted in a clockwise direction relative to FIG. 2 so that nose portion 190 engages catch pin 164. Under such conditions, shifting of the selector lever from the park or "P" position to another position is not possible.

Upon brake pedal 220 being depressed, brake light switch 218 will close to energize coil 216 of interrupter relay 214. Under such conditions, contacts 222 of the interrupter relay will open to deenergize coil 200 of the solenoid. Under such conditions, plunger 196 of the solenoid will no longer provide a resistance to the counterclockwise movement of the locking member so that tension spring 186 will operate to rotate the locking member in a counterclockwise direction out of the position as shown in FIG. 2. Shifting of the selector lever can then be effected from the park or "P" position to break the contacts of interlock switch 206. The opening of interlock switch 208 further will cause deenergization of coil 216 of interrupter relay 214 so that contacts 222 thereof again will be caused to close.

If selector lever mechanism 142 is then shifted back to the park or "P" position, coil 200 of solenoid 184 with again be energized and plunger 196 of the solenoid will be extended again to pivot the locking member into the position as shown in FIG. 2. However, the shifting force applied to selector lever 142 is sufficient to overcome the force exerted by the solenoid to permit catch pin 164 to register with and be received in indentation 174 of wall member 172. Under such conditions, locking member 182 will return to the position as shown in FIG. 2 under the action of plunger 196 to again lock the selector lever in the park or "P" position.

It will be appreciated that the invention is not limited to the particular embodiment as described. The locking mechanism can be adapted within the teachings of the invention so that locking can also occur when the selector lever is in the neutral or "N" position.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. In a motor vehicle having an automatic transmission, a selector lever operatively connected to said automatic transmission and movable selectively into non-drive and drive positions and a brake pedal, a control device comprising:
   locking means movable into a locking position relative to said selector lever when said selector lever is in said non-drive position and into an unlocking position,
   means for biasing said locking means into said unlocking position,
   means responsive to the positioning of said selector lever in said non-drive position for displacing said locking means into said locking position relative to said selector lever, and
   means responsive to the actuation of said brake pedal for deactivating said displacing means whereby said selector level is freed to be moved into said drive position.

2. A control device according to claim 1 wherein said biasing means comprises a retracting spring.

3. A control device according to claim 1 wherein said displacing means comprises an electrically actuated solenoid having a plunger extendable when said solenoid is energized to operatively engage said locking member and displace it into said locking position.

4. A control device according to claim 3 including a first electrical circuit including a coil of said electrically actuated solenoid and an interlock switch normally disposed in an open condition and operable to close when said selector lever is in the non-drive position.

5. A control device according to claim 4 wherein said first electrical circuit includes an ignition switch.

6. A control device according to claim 4 wherein said first electrical circuit includes a first set of contacts of an interrupter relay normally disposed in a closed condition and operable to open upon energization of a coil thereof, and including a second electrical circuit including said interlock switch, said coil of said interrupter relay and a brake switch normally disposed in an open position and operable to close upon actuation of said brake pedal.

7. In a motor vehicle having an automatic transmission, a selector lever operatively connected to said automatic transmission and pivotally displaceable about an axis between at least one non-drive position and at least one drive position, a plate member disposed adjacent said selector lever, said plate member having an opening therein disposed arcuately relative to said lever pivot axis, said selector lever having a radially displaceable catch pin relative to said lever pivot axis, projecting through said arcuate opening and biased in contact with an edge of said arcuate opening, said edge having spaced indentations adapted to receive said selector lever pin when said selector lever is disposed in said non-drive and drive positions, a control device comprising:

locking member pivotal about said selector lever axis and pivotable displaceable between a locking position and a non-locking position relative to said selector lever pin when said selector lever pin is disposed in an indentation corresponding to the non-drive position of said selector lever, said locking member having a first surface engaging said selector lever pin and a second surface disposed in the path of radial displacement of said selector lever pin relative to said lever pivot axis when said selector lever pin is disposed in said indentation corresponding to the non-drive position of said selector lever and said locking member is in the locking position, means for biasing said locking member into said unlocking position, means responsive to the positioning of said selector lever in said non-drive position for displacing said locking means into said locking position, and means responsive to the actuation of said brake pedal for deactivating said displacing means.

8. A control device according to claim 7 wherein said biasing means comprises a retracting spring.

9. A control device according to claim 7 wherein said displacing means comprises an electrically actuated solenoid having a plunger extendable when said solenoid is energized to operatively engage said locking member and displace it into said locking position.

10. A control device according to claim 9 including a first electrical circuit including a coil of said electrically actuated solenoid and an interlock switch normally disposed in an open condition and operable to close when said selector lever is in the non-drive position.

11. A control device according to claim 10 wherein said first electrical circuit includes an ignition switch.

12. A control device according to claim 10 wherein said first electrical circuit includes a first set of contacts of an interrupter relay normally disposed in a closed condition and operable to open upon energization of a coil thereof, and including a second electrical circuit including said set of contacts of said interlock switch, said coil of said interrupter relay and a brake switch normally disposed in an open condition and operable to close upon actuation of said brake pedal.

* * * * *